(12) United States Patent
Ueyama et al.

(10) Patent No.: US 7,990,834 B2
(45) Date of Patent: Aug. 2, 2011

(54) OPTICAL PICKUP DEVICE RECORDING AND/OR REPRODUCING INFORMATION ON AND/OR FROM A PLURALITY OF KINDS OF RECORDING MEDIA

(75) Inventors: Tetsuo Ueyama, Nara (JP); Osamu Miyazaki, Kyoto (JP); Yukio Watanabe, Kyoto (JP); Yasuo Nakata, Nara (JP); Tomio Mashiyama, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1367 days.

(21) Appl. No.: 11/495,907

(22) Filed: Jul. 28, 2006

(65) Prior Publication Data
US 2007/0053270 A1 Mar. 8, 2007

(30) Foreign Application Priority Data
Jul. 28, 2005 (JP) .................... 2005-219490

(51) Int. Cl.
*G11B 7/135* (2006.01)
(52) U.S. Cl. ............ 369/112.06; 369/44.37; 369/112.01; 369/110.03; 369/109.02; 369/112.05
(58) Field of Classification Search .............. 369/112.05, 369/109.01, 109.02, 110.03, 112.01, 112.03, 369/112.04, 112.06, 44.37
See application file for complete search history.

(56) References Cited

U.S. PATENT DOCUMENTS

| | | | | |
|---|---|---|---|---|
| 5,483,508 A * | 1/1996 | Miyake et al. | ............. | 369/44.23 |
| 6,721,242 B2 * | 4/2004 | Ohnishi et al. | ............. | 369/44.26 |
| 6,728,035 B2 * | 4/2004 | Takasuka et al. | ............. | 359/569 |
| 7,260,033 B2 * | 8/2007 | Shimano et al. | ............ | 369/44.37 |
| 2004/0081064 A1 * | 4/2004 | Ohnishi et al. | ................ | 369/125 |
| 2004/0252620 A1 | 12/2004 | Watanabe et al. | | |
| 2005/0030877 A1 * | 2/2005 | Horiyama | ................ | 369/112.06 |
| 2005/0122862 A1 * | 6/2005 | Shin et al. | ................... | 369/44.41 |
| 2005/0276205 A1 * | 12/2005 | Heor et al. | ............... | 369/112.02 |
| 2008/0253263 A1 * | 10/2008 | Komma | ................... | 369/112.05 |
| 2009/0046554 A1 * | 2/2009 | Katayama | .................. | 369/53.28 |

FOREIGN PATENT DOCUMENTS

| | | |
|---|---|---|
| JP | 61-094246 | 5/1986 |
| JP | 09-081942 | 3/1997 |
| JP | 2004-145915 | 5/2004 |
| JP | 2005-004932 | 1/2005 |

\* cited by examiner

*Primary Examiner* — Wayne R Young
*Assistant Examiner* — Dionne H Pendleton
(74) *Attorney, Agent, or Firm* — Edwards Angell Palmer & Dodge LLP; David G. Conlin; William J. Daley, Jr.

(57) ABSTRACT

An optical pickup device has a semiconductor laser emitting light which is in turn branched via a diffraction grating into at least three beams of light including a main beam and two sub beams which are in turn condensed via an objective lens on an optical disk at a guide groove and reflected by the optical disk to provide three reflections of light which are in turn received by detectors, each divided into two regions, respectively, to generate a tracking error signal. The diffraction grating is divided into three regions including a first region, a second region and a third region located intermediate therebetween, each having a periodical structure out of phase, the periodical structure having grating grooves in a direction determined depending on the phase of the second region to incline relative to a direction perpendicular to the guide groove of the optical disk.

6 Claims, 9 Drawing Sheets

AMOUNT OF SHIFTING
OBJECTIVE LENS (μm)

OPTICAL PICKUP DEVICE RECORDING AND/OR REPRODUCING INFORMATION ON AND/OR FROM A PLURALITY OF KINDS OF RECORDING MEDIA

This nonprovisional application is based on Japanese Patent Application No. 2005-219490 filed with the Japan Patent Office on Jul. 28, 2005, the entire contents of which are hereby incorporated by reference.

BACKGROUND OF THE INVENTION

1. Field of the Invention

The present invention relates generally to optical pickup devices and particularly to optical pickup devices optically recording information on and reproducing information from a plurality of different types of recording media having guide grooves, respectively, different in pitch.

2. Description of the Background Art

In recent years, optical disks, optical cards and similar recording media can record large amounts of information signals densely and are accordingly utilized in audio equipment, video equipment, computers and other equipment.

Recently, in particular, for motion video information and the like used for example in computers, the data that are handled are drastically increasing in amount. Accordingly, a recording pit reduced in size, a guide groove reduced in pitch and the like are provided to provide optical disks with large capacities.

The above described optical disks and similar recording media have an information signal recorded therein in microns. Accordingly, reproducing such signal therefrom entails causing a beam of light to track a recording guide groove precisely. A variety of methods of detecting a tracking error signal is known.

For example, Japanese Patent Laying-Open No. 61-094246 describes a differential push-pull (DPP) method employing three beams including a main beam and two sub beams. The DPP method is generally employed for a variety of recording optical disks including compact disk-recordable/rewritable (CD-R/RW).

The DPP method, however, requires that relative to a guide groove at which the main beam is positioned, the sub beams be positioned offset in the radial direction of an optical disk by ½ of the pitch of the guide groove. This provides a tracking error signal degraded for a different type of optical disk having a guide groove different in pitch.

As a means for resolving such problem, Japanese Patent Laying-Open No. 09-081942 proposes a method, as will be described hereinafter with reference to FIGS. 11-14.

FIG. 11 schematically shows a structure of an optical system of a conventional optical pickup device 100.

With reference to the figure, optical pickup device 100 includes a semiconductor laser 1, a collimator lens 2, a diffraction grating 300A, a beam splitter 4, an objective lens 5, a condenser lens 7, and a photoreceptive unit 8 including photoreceptive elements 8A-8C each divided into two regions. Optical pickup device 100 records information on and reproduces information from an optical disk 6 having a guide groove 61.

Semiconductor laser 1 emits a beam of light 30P which is received by collimator lens 2 and collimated thereby. The collimated light is divided by diffraction grating 300A serving as an optical branching element into a main beam 30 for recording and reproduction and detecting a servo signal and two sub beams 31 and 32 for tracking. The three beams 30-32 are transmitted through beam splitter 4 and condensed by objective lens 5 on a recording medium or optical disk 6 at guide groove 61.

The three beams of light 30-32 are reflected and again transmitted through objective lens 5, reflected by beam splitter 4 and incident through condenser lens 7 on the three photoreceptive elements 8A-8C, respectively, which detect a push pull signal MPP of main beam 30 and push pull signals SPP1 and SPP2 of sub beams 31 and 32, respectively. Optical pickup device 100, as well as the conventional DPP method, obtains a tracking error signal TR by the following operation:

$$TR = MPP - k \cdot (SPP1 + SPP2),$$

wherein k represents a coefficient correcting a difference in quantity of light between main beam 30 and sub beams 31 and 32. Furthermore, $k \cdot (SPP1+SPP2)$ will also be indicated as a composite sub beam push pull signal SPP.

The conventional optical pickup device 100 shown in FIG. 11 is characterized by a periodical structure that diffraction grating 300A has. This feature will now be described with reference to FIGS. 12-14.

FIG. 12 is a perspective view of the structure of diffraction grating 300A in optical pickup device 100 shown in FIG. 11.

As shown in FIG. 12, diffraction grating 300A is divided into a first region 300a and a second region 300b by a line extending in a direction Y corresponding to that of guide groove 61 of optical disk 6. These regions each have a structure having a protrusion and a depression extending in a direction X perpendicular to that of guide groove 61 and periodically repeated such that the periodical structures have phases, respectively, different from each other by 180°.

FIG. 13 shows a position of main beam 30 and sub beams 31 and 32 condensed on optical disk 6 at guide groove 61 for optical pickup device 100 shown in FIG. 11.

As shown in FIG. 13, sub beams 31 and 32 diffracted by the periodical structure of diffraction grating 300A each have on optical disk 6 at guide groove 61 an optical phase difference of 180° in a half thereof. Consequently, sub beam 31 is divided into spots of condensed light 31m and 31n and sub beam 32 is divided into spots of condensed light 32m and 32n. Sub beams 31 and 32 each thus form spots of condensed light having two peaks, respectively, in intensity.

FIG. 14 represents in waveform push pull signals MPP, SPP, SPP1, SPP2 corresponding to a structure of optical disk 6 for optical pickup device 100 shown in FIG. 11.

As shown in the figure, sub beams 31 and 32 provide push pull signals SPP1 and SPP2 18020 out of phase with push pull signal MPP of main beam 30. Similarly, composite sub beam push pull signal SPP has a waveform 180° out of phase, in opposite phase, with push pull signal MPP of main beam 30.

As such if sub beams 31 and 32 are positioned on the same guide groove 61 as main beam 30, as shown in FIG. 13, tracking error signal TR as intended is obtained. Optical pickup device 100 shown in FIG. 11 can thus accommodate a different type of optical disk having a guide groove different in pitch from optical disk 6.

The above described DPP system, however, has a significant disadvantage in practical use. Currently increasingly used digital versatile disks (DVDs) include DVD-R/RW (having a storage capacity of 4.7 GB and a guide groove with a pitch of 0.74 μm), DVD-Random Access Memory (DVD-RAM) 1 (having a storage capacity of 2.6 GB and a guide groove with a pitch of 1.48 μm), DVD-RAM2 (having a storage capacity of 4.7 GB and a guide groove with a pitch of 1.23 μm), and the like.

If such a variety of DVDs is subjected to the system disclosed in Japanese Patent Laying-Open No. 09-081942, and objective lens 5 shifts in a direction (X) orthogonal to guide groove 61 of optical disk 6, then, tracking error signal TR would significantly be reduced in amplitude as compared with that provided in the conventional DPP method. Such reduction in amplitude is significant particularly for DVD-RAM1, DVD-RAM2, and other similar disks having guide grooves large in pitch.

An arithmetic circuit, a control circuit and the like for tracking error signal TR receives a signal, which in general is limited in how it varies in amplitude, and if tracking error signal TR significantly varies in amplitude as the objective lens shifts, optical pickup device 100 is significantly reduced in range of practical use.

The above disadvantage is resolved by a method, as disclosed in Japanese Patent Laying-Open No. 2004-145915. The publication describes an optical pickup device basically identical to the optical system of optical pickup device 100 shown in FIG. 11 except that diffraction grating 300A serving as an optical branching element is replaced with a diffraction grating 300B having a feature as will be described hereinafter with reference to FIG. 15.

FIG. 15 is a perspective view of a structure of diffraction grating 300B serving as another example of diffraction grating 300A in optical pickup device 100 of FIG. 11.

As shown in the figure, diffraction grating 300B has constantly periodically repeated grating grooves formed therein and is divided into at least three regions, i.e., first, second and third regions 300a, 300b and 300c, by a line extending in a direction (Y) orthogonal to that of the grating grooves.

While the second region 300b has a periodical structure with a phase similarly as described for diffraction grating 300A of Japanese Patent Laying-Open No. 09-081942, i.e., 180° out of phase with the first region 100a, the third region 300c intermediate between the first and second regions 300a and 300b is structured to be 90° out of phase with the first region 300a.

Diffraction grating 300B thus structured can also prevent tracking error signal TR significantly reduced in amplitude as the objective lens shifts for example for DVD-RAM1 and DVD-RAM2 having guide grooves with large pitches. Optical pickup device 100 can thus be increased in range of practical use.

Japanese Patent Laying-Open No. 2004-145915 describes that diffraction grating 300B divided in three has each region having a periodical structure with a phase offset by an amount limited to 90° and 180°.

If a diffraction grating has a periodical structure positionally offset between adjacent regions to add a phase difference to diffracted light (or a sub beam), the diffraction grating, having a limited number of grating lines providing protrusions and depressions, cannot provide accurate phase variation at a boundary region. In that case, there is also caused unwanted high-order diffracted light, and hence reduced efficiency in utilization of light and unwanted light acting as noise. Accordingly, achieving an object with a minimized phase difference is desired.

Furthermore, diffraction grating 300B that has regions having the periodical structure with their respective phases offset by amounts limited to 180° and 90° has the intermediate or third regions 300c limited in optimum width and hence a reduced degree of freedom in design. Japanese Patent Laying-Open No. 2004-145915 is silent on a combination of phase offsets other than other than 180° and 90°, and any relationship between the direction of the grating grooves of the diffraction grating and a phase difference given.

SUMMARY OF THE INVENTION

The present invention contemplates an optical pickup device that can also minimize that degradation in amplitude of a tracking error signal which is caused as an objective lens shifts for a plurality of types of optical disks having guide grooves, respectively, different in pitch despite a diffraction grating divided into multiple regions provided with phases, respectively, offset by a reduced amount.

The present invention is an optical pickup device having a laser as a source of light emitting light in turn branched via an optical branching element into at least three beams of light including a main beam and two sub beams in turn condensed via an objective lens on an optical recording medium at a guide groove and reflected by the optical recording medium to provide three reflections of light in turn received by different detectors, each divided into two regions, respectively, to obtain a differential signal from the detectors to generate a tracking error signal from the differential signal, the optical branching element being a diffraction grating divided into at least three regions including a first region, a second region and a third region located intermediate between the first and second regions, the first, second and third regions having a periodical structure with their respective phases different from each other, the periodical structure having grating grooves in a direction determined depending on the phase of the second region to incline relative to a direction perpendicular to the guide groove of the optical recording medium.

Preferably, if relative to the first region the second regions has a phase difference $\alpha$ in degrees, on the optical recording medium the main beam and the sub beams have a distance L therebetween, and the optical recording medium has the guide groove with a pitch M, then the optical branching element has the periodical structure with the grating grooves in a direction inclined relative to the direction perpendicular to the guide groove of the optical recording medium by an angle $\theta = ((180-\alpha)/360)\tan^{-1}(M/L)$.

Preferably the second region has the phase difference $\alpha$ of at least 30° and at most 180°.

Preferably the third region is provided with a phase difference of approximately ½ of the phase difference $\alpha$ of the second region.

Preferably the third region is further divided into at least two regions each having a different phase difference smaller than the phase difference $\alpha$ of the second region.

Preferably the third region has a phase smoothly varying from that of the periodical structure of the first region to that of the periodical structure of the second region.

Preferably the third region has the periodical structure of the first region and that of the second region alternately.

In accordance with the present invention, if a diffraction grating divided into multiple regions provided with phases, respectively, offset by a reduced amount, there can be provided a tracking error signal that is not degraded for a plurality of types of optical disks having guide grooves, respectively, different in pitch, and the signal can also be prevented from significantly reducing in amplitude as the objective lens shifts.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter an embodiment of the present invention will now be more specifically described with reference to the drawings. Note that in the figures, identical or like components are identically denoted and will not be described repeatedly.

First Embodiment

Figure 1:
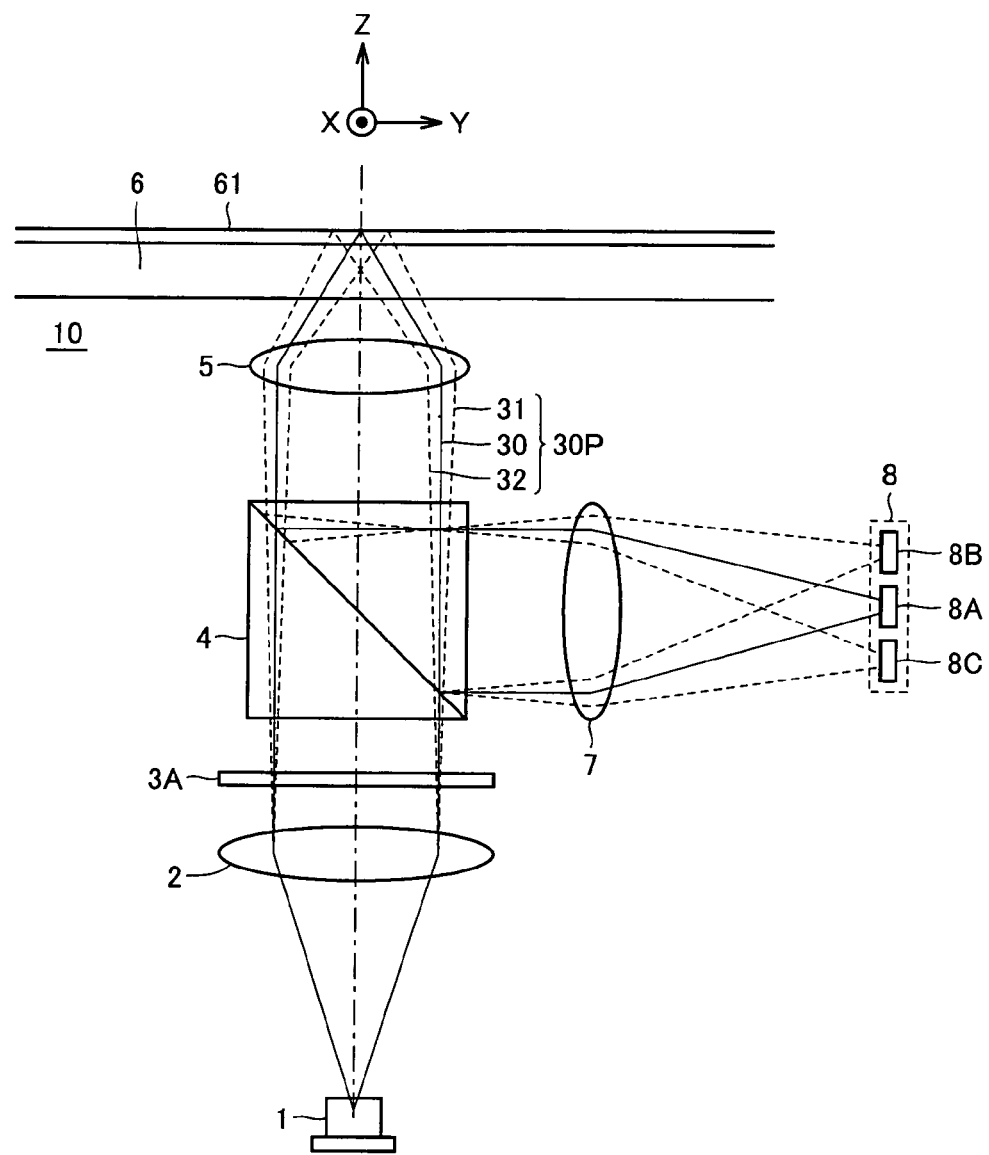
FIG. 1 schematically shows a configuration of an optical system of an optical pickup device 10 in a first embodiment of the present invention.

FIG. 1 schematically shows a configuration of an optical system of an optical pickup device 10 in a first embodiment of the present invention.

Figure 11:
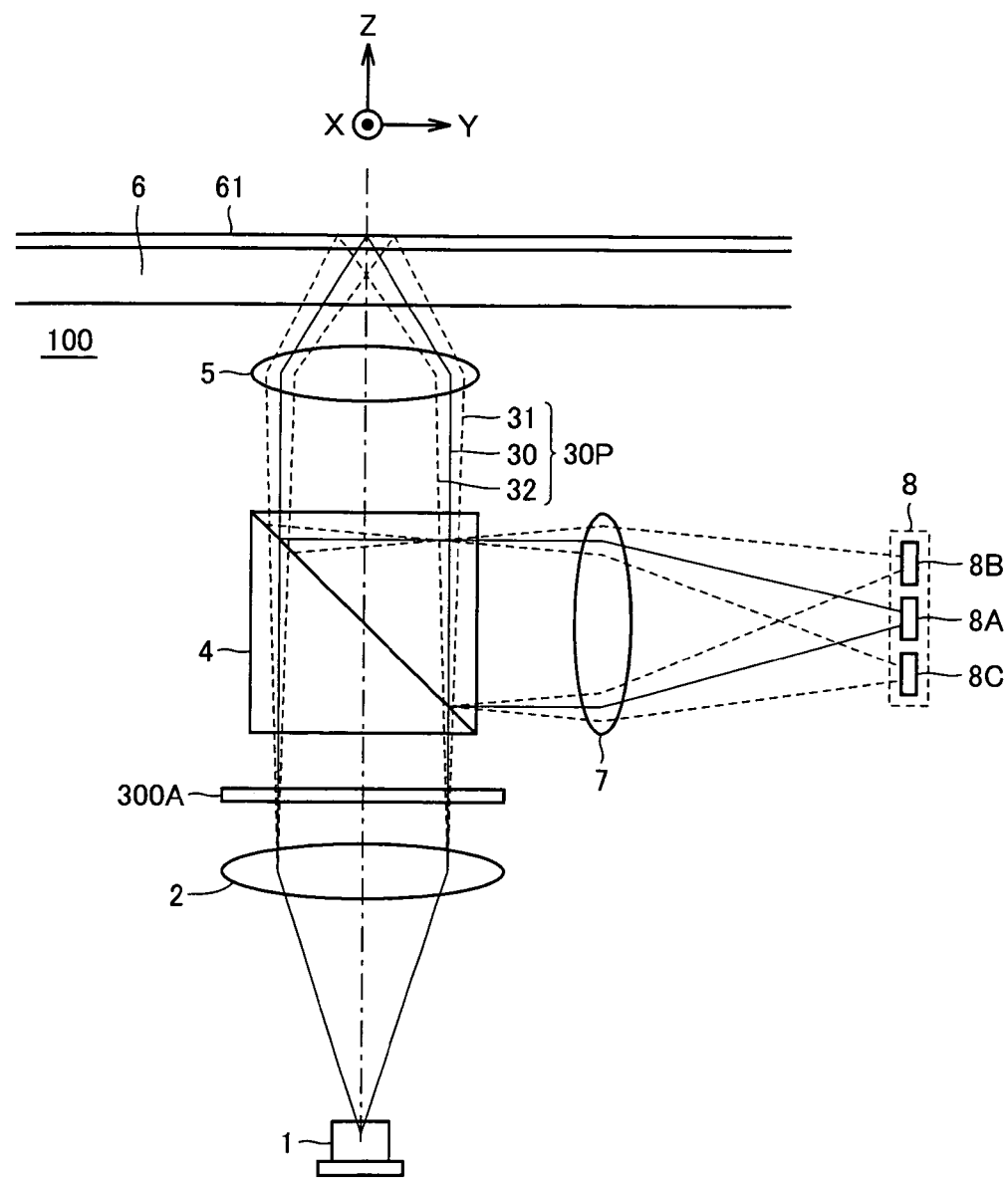
FIG. 11 schematically shows a configuration of an optical system of a conventional optical pickup device 100.
Figure 12:
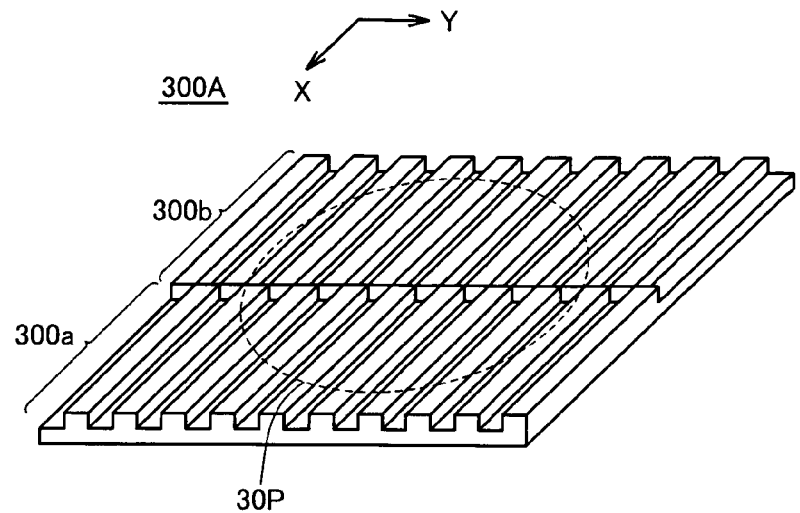
FIG. 12 is a perspective view of a structure of diffraction grating 300A in optical pickup device 100 of FIG. 11.
Figure 13:
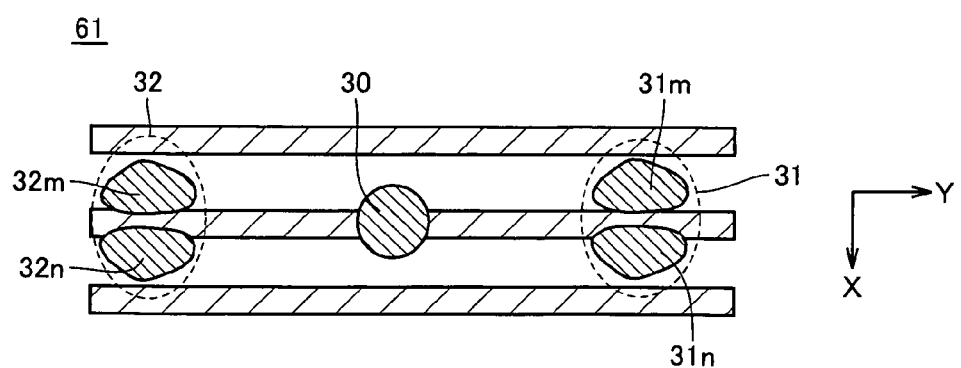
FIG. 13 shows a position of main beam 30 and sub beams 31 and 32 condensed on optical disk 6 at guide groove 61 for optical pickup device 100 of FIG. 11.
Figure 14:
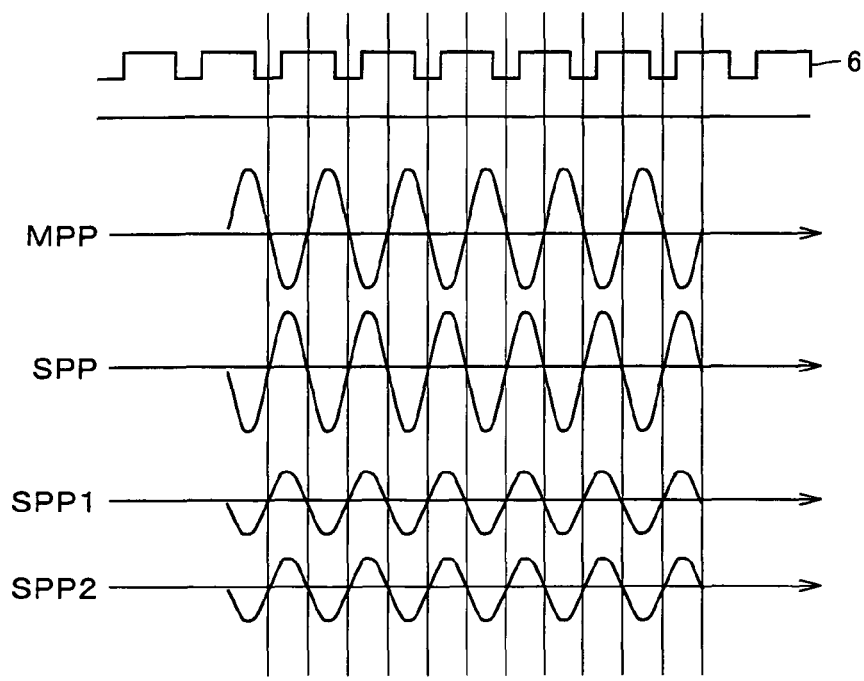
FIG. 14 represents push pull signals MPP, SPP, SPP1, SPP2 in waveform corresponding to a structure of optical disk 6 for optical pickup device 100 of FIG. 11.
Figure 15:
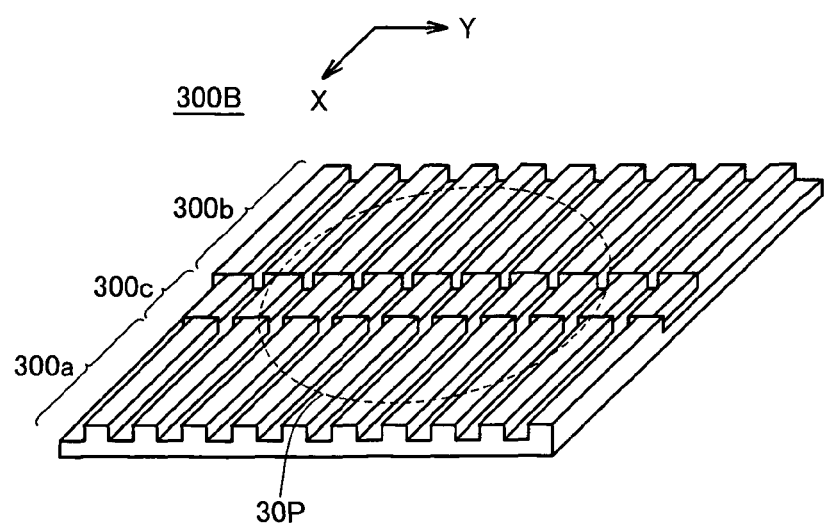
FIG. 15 is a perspective view of a structure of diffraction grating 300B serving as another example of diffraction grating 300A in optical pickup device 100 of FIG. 11.

As shown in FIG. 1, the first embodiment provides optical pickup device 10 different from optical pickup device 11 of FIG. 11 in that diffraction grating 300A serving as an optical branching element is replaced with a diffraction grating 3A. Accordingly, the components that overlap FIG. 11 will not be described repeatedly.

Figure 2:
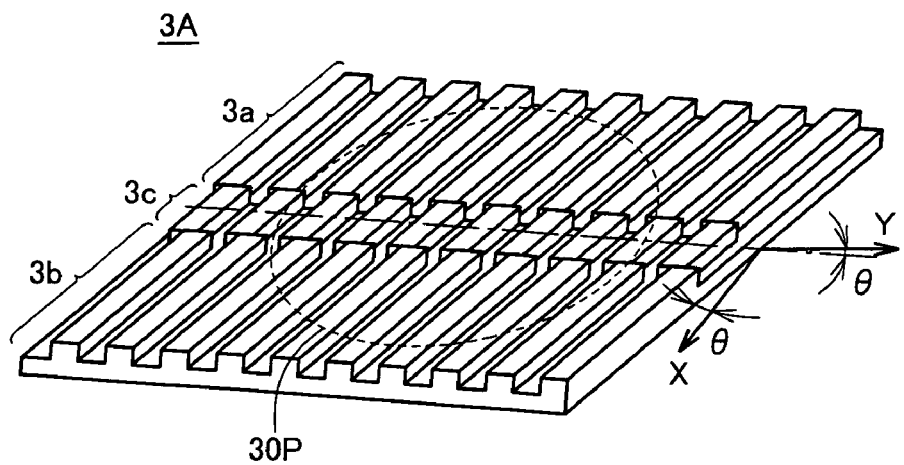
FIG. 2 is a perspective view of a structure of a diffraction grating 3A in optical pickup device 10 of FIG. 1.

FIG. 2 is a perspective view of a structure of diffraction grating 3A in optical pickup device 10 of FIG. 1.

As shown in the figure, the first embodiment provides diffraction grating 3A divided into first, second and third regions 3a, 3b and 3c by a line having a direction perpendicular to that of its grating grooves, with each region having a structure having a protrusion and a depression which extend in a direction inclined relative to a direction X by an angle θ and are periodically repeated. In other words, the first embodiment provides diffraction grating 3A having grating grooves in a direction inclined by angle θ relative to directions X and Y. This will furthermore specifically be described with reference to FIG. 3.

Figure 3:
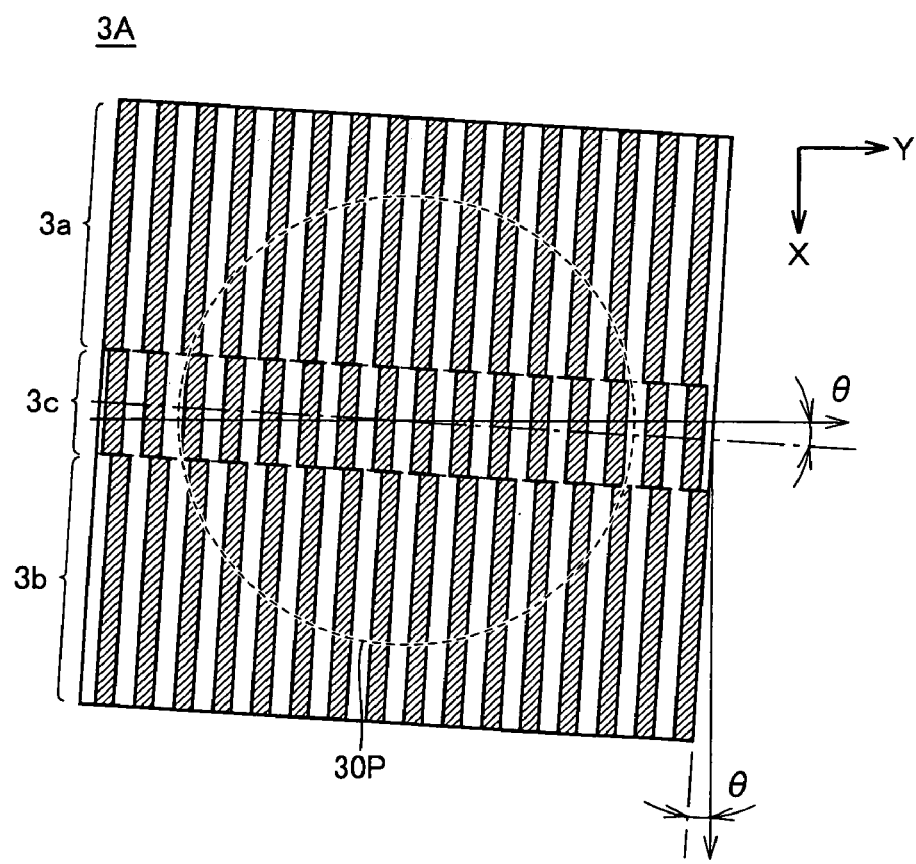
FIG. 3 shows a periodical structure of diffraction grating 3A in optical pickup device 10 of FIG. 1.

FIG. 3 shows the periodical structure of diffraction grating 3A in optical pickup device 10 of FIG. 1.

As shown in the figure, the first embodiment provides diffraction grating 3A, by way of example, having the second region 3b with its periodical structure 120° out of phase with the first region 3a, and the third region 3c intermediate between the first and second regions 3a and 3b with its periodical structure 60° out of phase with the first region 3a.

Furthermore, if a direction corresponding to that of guide groove 61 of optical disk 6 is represented as direction Y and a direction perpendicular thereto is represented as direction X, then diffraction grating 3A has grating grooves set in a direction inclined relative to directions X and Y by angle θ.

Figure 4:
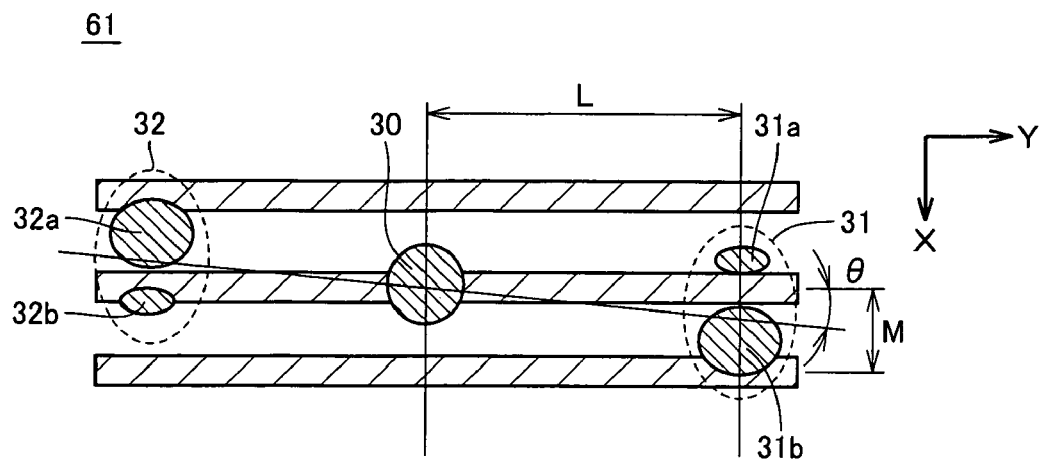
FIG. 4 shows a position of a main beam 30 and sub beams 31 and 32 condensed on a optical disk 6 at a guide groove 61 for optical pickup device 10 of FIG. 1.

FIG. 4. shows a position of a main beam 30 and sub beams 31 and 32 condensed on optical disk 6 at guide groove 61 for optical pickup device 10 of FIG. 1.

As shown in the figure, sub beams 31 and 32 diffracted by the periodical structure of diffraction grating 3A each have on optical disk 6 at guide groove 61 an optical phase difference at a portion thereof. Consequently, sub beam 31 is divided into spots of condensed light 31a and 31b and sub beam 32 is divided into spots of condensed light 32a and 32b. Sub beams 31 and 32 each thus form spots of condensed light providing two peaks in intensity.

With reference to FIG. 4, if relative to the first region 3a the second region 3b has a phase difference represented by α (in degrees), on optical disk 6 main beam 30 and sub beams 31 and 32 have a distance therebetween represented by L (in μm), and optical disk 6 has guide groove 61 with a pitch represented by M (in μm), then angle θ is defined by:

$$\theta = ((180-\alpha)/360)\tan^{-1}(M/L) \quad (1).$$

Distance L on optical disk 6 between main beam 30 and sub beams 31 and 32 depends on the optical system of interest. For example, if L=15 μm and a DVD-R/RW has a guide groove with a pitch M=0.74 μm, then, for α=120° as shown in FIG. 3, diffraction grating 3A has an inclination or angle θ=0.47°. This allows optical pickup device 10 of the first embodiment to provide tracking error signal TR invariable in amplitude and hence a completely equivalent signal for the DVD-R/RW, similarly as provided in the conventional DPP method.

Main beam 30 provides push pull signal MPP and sub beams 31 and 32 provide push pull signals SPP1, SPP2, SPP, as will be described hereinafter.

Figure 5:
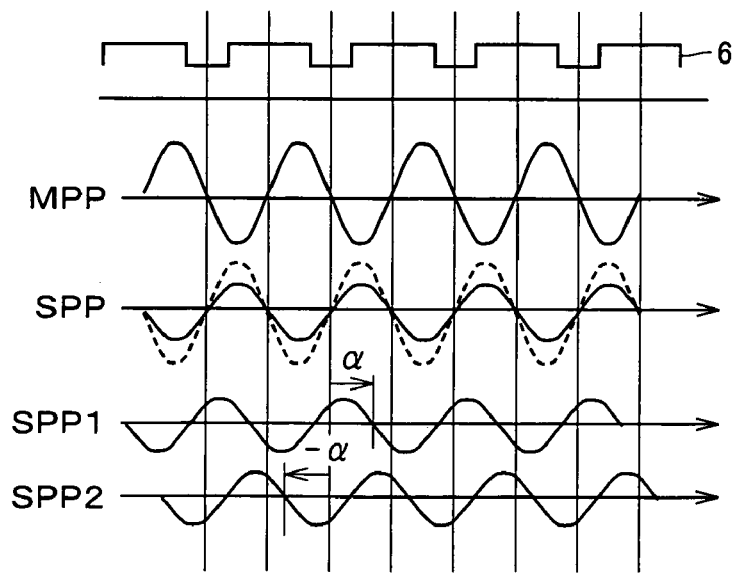
FIG. 5 represents push pull signals MPP, SPP, SPP1, SPP2 in waveform corresponding to a structure of optical disk 6 before diffraction grating 3A is rotated by an angle θ.

FIG. 5 represents push pull signals MPP, SPP, SPP 1, SPP2 in waveform corresponding to a structure of optical disk 6 before diffraction grating 3A is rotated by angle θ.

FIG. 5 represents push pull signals MPP, SPP, SPP 1, SPP2 in waveform provided when relative to the first region 3a the second region 3b has phase difference α. If the second region 3b has grating grooves +α out of phase with those of the first region 3a, sub beam 31 (or a first-order, positive, diffracted beam of light) has an optical phase difference of +α added thereto and sub beam 32 (or a first-order, negative, diffracted beam of light) has an optical phase difference of −α added thereto.

Accordingly, if diffraction grating 3A has grating grooves in a direction matching that perpendicular to guide groove 61 of optical disk 6, as assumed as shown in FIG. 5, then the first-order, positive, diffracted beam of light provides push pull signal SPP1+α out of phase with push pull signal MPP of the main beam and, in contrast, the first-order, negative, diffracted beam of light provides push pull signal SPP2−α out of phase therewith.

In the above described case, as shown in FIG. 5, push pull signals SPP1 and SPP2 added together, i.e., composite sub beam push pull signal SPP, reduces from a maximum amplitude. Accordingly, diffraction grating 3A is rotated around an optical axis (or an axis Z) to have its grating grooves in a direction inclined relative to direction X by angle θ to maximize composite sub beam push pull signal SPP in amplitude for optical disk 6 (e.g., DVD-R/RW).

Figure 6:
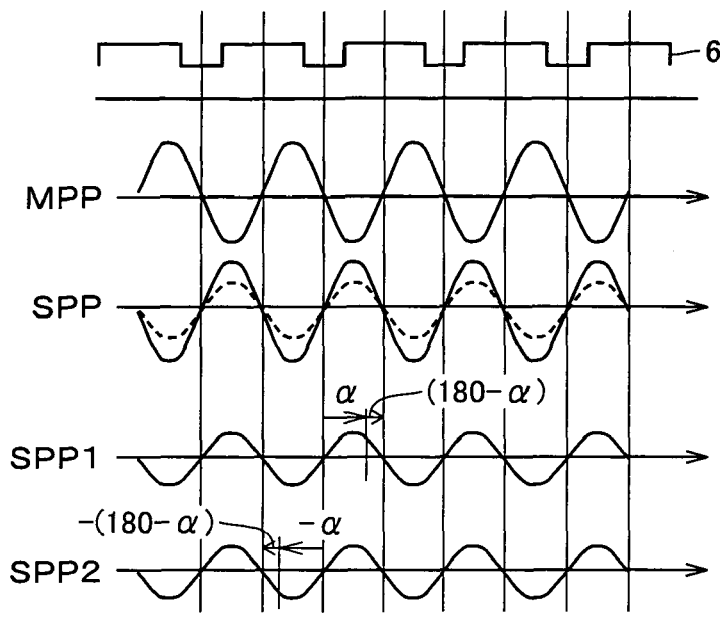
FIG. 6 represents push pull signals MPP, SPP, SPP1, SPP2 in waveform corresponding to the structure of optical disk 6 after diffraction grating 3A is rotated by angle θ.

FIG. 6 represents push pull signals MPP, SPP, SPP1, SPP2 in waveform corresponding to the structure of optical disk 6 after diffraction grating 3A is rotated by angle θ.

As shown in the figure, rotating diffraction grating 3A by angle θ allows push pull signal SPP1 to have a waveform (180−α) out of phase and push pull signal SPP2 to have a waveform—(180−α) out of phase. This can provide composite sub beam push pull signal SPP similar to that provided in the conventional DPP method.

Figure 7:
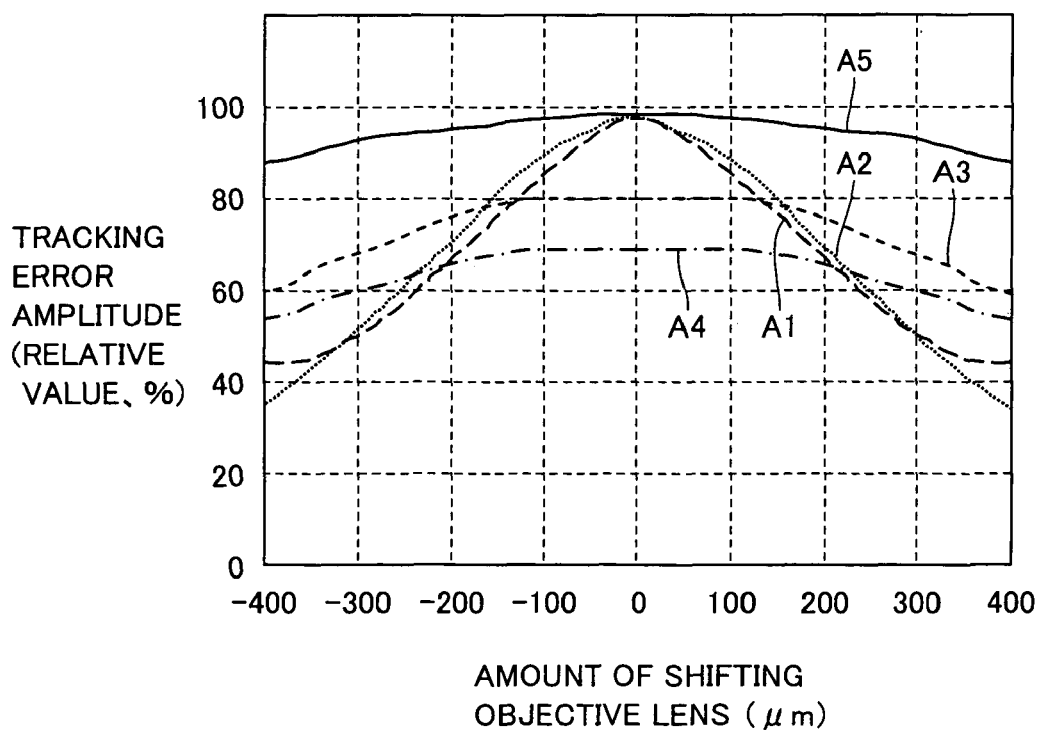
FIG. 7 represents for optical pickup device 10 of FIG. 1 a characteristic of tracking error signal TR in how it varies in amplitude for optical disk 6 provided in a variety of DVDs.

FIG. 7 represents for optical pickup device 10 of FIG. 1 a characteristic of tracking error signal TR in how it varies in amplitude for optical disk 6 provided in a variety of DVDs. In the figure, the horizontal axis represents an amount, as represented in micrometers, of shifting an objective lens, and the vertical axis represents tracking error amplitude (in relative value, as represented in %).

The relative value as represented along the vertical axis represents a relative value of a variation in amplitude with reference to an amplitude of tracking error signal TR provided in the system of Japanese Patent Laying-Open No. 09-081942 when an objective lens has a shift of zero. Such value was obtained for DVD-RAM1 (having a guide groove with a pitch of 1.48 μm), DVD-RAM2 (having a guide groove with a pitch of 1.23 μm) and a DVD-R/RW (having a guide groove with a pitch of 0.74 μm).

With reference to FIG. 7, curves A1 and A2 represent variations in amplitude in the system of Japanese Patent Laying-Open No. 09-081942 for DVD-RAM1 and DVD-RAM2, respectively. Curves A3 and A4 represent variations in amplitude in the system of the first embodiment of the present invention for DVD-RAM1 and DVD-RAM2, respectively. A curve A5 represents a variation in amplitude for the DVD-R/RW, which is substantially the same characteristic between the system of Japanese Patent Laying-Open No. 09-081942 and that of the first embodiment.

As shown in FIG. 7, the system of the first embodiment (curves A3 and A4), as compared with that of Japanese Patent Laying-Open No. 09-081942, can also significantly prevent tracking error signal TR from having an amplitude varying increasingly/decreasingly for DVD-RAM1 and DVD-RAM2 having guide grooves with large pitches as the objective lens shifts. Although curves A3 and A4 show amplitude smaller in absolute value than curves A1 and A2, increasing in gain for example by a signal generation circuit or the like allows them to be used without problem.

In the above description diffraction grating 3A has relative to the first region 3a the second region 3b with a phase difference of 120° and the third region 3c with that of 60°. However, it is not limited to such a combination of phase differences; it is similarly effective with combinations for example of: 60° and 30°; 90° and 45°; and the like.

It should be noted, however, that if relative to the first region 3a the second region 3b has phase difference α reduced in absolute value, and a DVD-RAM having a guide groove with a large pitch is subjected to reproduction, the tracking error signal is significantly degraded in amplitude as the objective lens shifts. Accordingly, desirably, phase difference α is set in a range of 30°≦α≦180°.

The first embodiment can thus provide diffraction grating 3A having regions with their respective phases having a difference appropriately set, and rotated by angle θ to significantly prevent tracking error signal TR from having an amplitude varying increasingly/decreasingly as the objective lens shifts.

First Exemplary Variation of First Embodiment

Optical pickup device 10 of the first embodiment shown in FIG. 1 with diffraction grating 3A serving as an optical branching element replaced with a diffraction grating 3B will now be described as a first exemplary variation with reference to FIG. 8.

Figure 8:
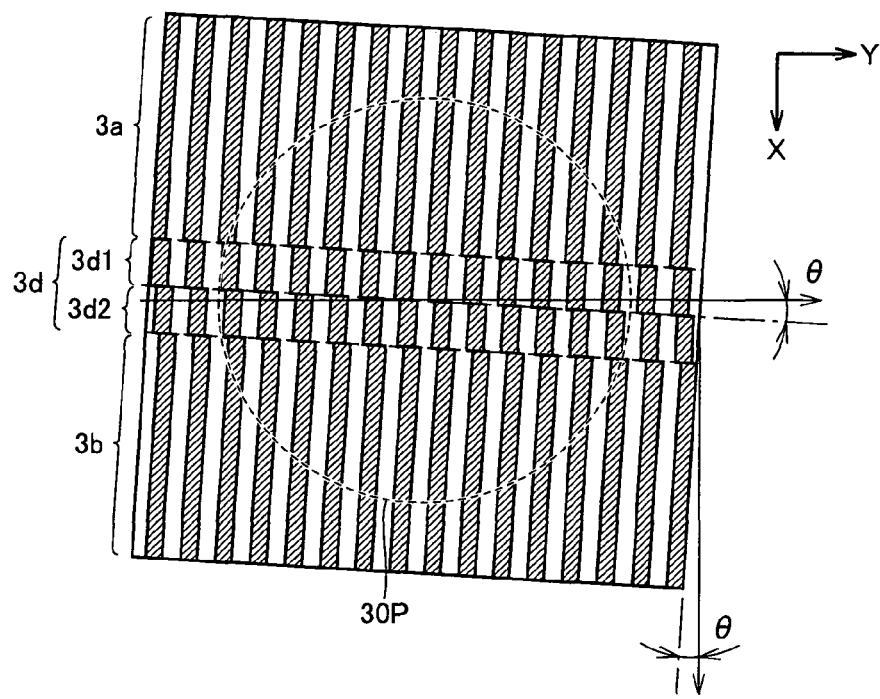
FIGS. 8, 9 and 10 show periodical structures of diffraction gratings 3B, 3C and 3D in first, second and third exemplary variations, respectively, of the first embodiment of the present invention.

FIG. 8 shows a periodical structure of diffraction grating 3B in the first exemplary variation of the first embodiment of the present invention.

As shown in the figure, the first exemplary variation provides diffraction grating 3B divided into first, second and third regions 3a, 3b and 3d by a line having a direction perpendicular to that of its grating grooves, with each region having a structure with a protrusion and a depression that extend in a direction inclined relative to direction X by angle θ and are periodically repeated.

The first exemplary variation provides diffraction grating 3B having the third region 3d located intermediate between the first and second regions 3a and 3b and further divided in two to provide regions 3d1 and 3d2. If a direction corresponding to that of guide groove 61 of optical disk 6 is represented as direction Y and a direction perpendicular thereto is represented as direction X, then the first exemplary variation provides diffraction grating 3B having grating grooves set in a direction inclined relative to directions X and Y by angle θ, similarly as has been described for diffraction grating 3A with reference to FIG. 3.

The first exemplary variation provides diffraction grating 3B, by way of example, having the second region 3b having a periodical structure 120° out of phase with the first region 3a, and the third region 3d with regions 3d1 40° out of phase with the first region 3a and region 3d2 80° out of phase with the first region 3a. If diffraction grating 3B has the second region 3b out of phase by an amount α, then diffraction grating 3B has region 3d1 set to be out of phase by an amount of α/3 an region 3d2 set to be out of phase by an amount of 2α/3.

While FIG. 8 shows the third region 3d divided in two by way of example, the region is not limited to division in two and may be divided in n and have a phase offset added stepwise, wherein n is an integer of at least 2. In that case, providing regions successively adjacent to the first region 3a such that they are successively out of phase by an amount of α/(n+1) will suffice. Thus dividing the third region 3d into multiple regions each having a phase offset by an amount added stepwise can also be as effective as or more effective than the first embodiment.

Second Exemplary Variation of First Embodiment

Optical pickup device 10 of the first embodiment shown in FIG. 1 with diffraction grating 3A serving as an optical branching element replaced with a diffraction grating 3C will now be described as a second exemplary variation with reference to FIG. 9.

Figure 9:
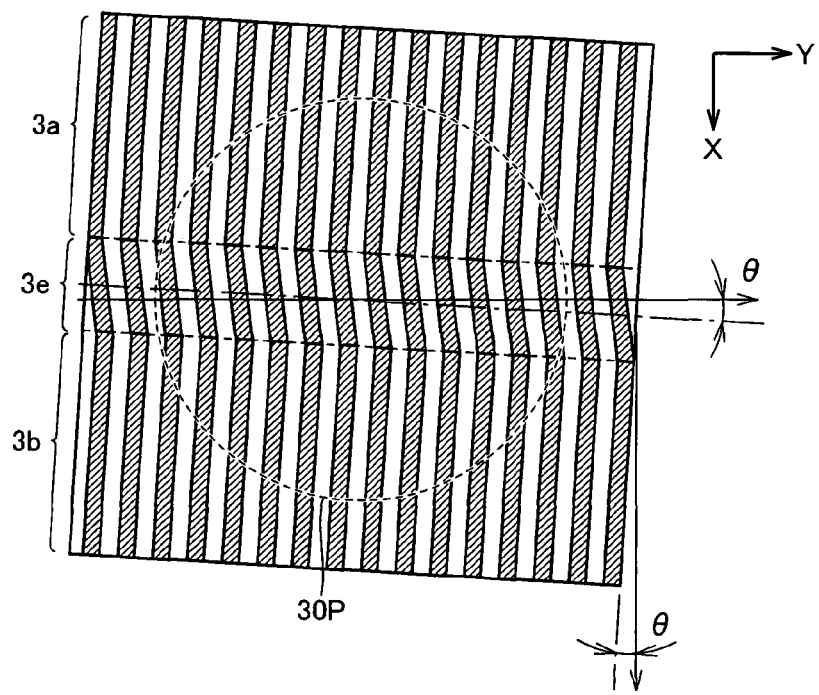

FIG. 9 shows a periodical structure of diffraction grating 3C in the second exemplary variation of the first embodiment of the present invention.

As shown in the figure, the second exemplary variation provides diffraction grating 3C divided into first, second and third regions 3a, 3b and 3e by a line having a direction perpendicular to that of its grating grooves, with each region having a structure with a protrusion and a depression that extend in a direction inclined relative to direction X by angle θ or an angle (θ−Δ) and are periodically repeated.

The second exemplary variation provides diffraction grating 3C having the third region 3e located intermediate between the first and second regions 3a and 3b. The third region 3e has a structure with a protrusion and a depression periodically repeated and adjacent to both those of the structure of the first region 3a and those of the structure of the second region 3b. Consequently, diffraction grating 3C has the third region 3e different in inclination from the first and second regions 3a and 3b. If a direction corresponding to that of guide groove 61 of optical disk 6 is represented as direction Y and a direction perpendicular thereto is represented as direction X, then the second exemplary variation provides diffraction grating 3C having grating grooves set in a direction inclined relative to directions X and Y by angle θ, similarly as has been described for diffraction grating 3A with reference to FIG. 3.

As has been described above, the second exemplary variation can provide diffraction grating 3C including the third regions 3e having a structure with a protrusion and a depression periodically repeated and adjacent to both those of the structure of the first region 3a and those of the structure of the second region 3b. Diffraction grating 3C thus structured corresponds to diffraction grating 3B described in the first exemplary variation that has the third region 3d divided in n increased indefinitely. This example is also as effective as or more effective than the first embodiment.

Third Exemplary Variation of First Embodiment

Optical pickup device 10 of the first embodiment shown in FIG. 1 with diffraction grating 3A serving as an optical branching element replaced with a diffraction grating 3D will now be described as a third exemplary variation with reference to FIG. 10.

Figure 10:
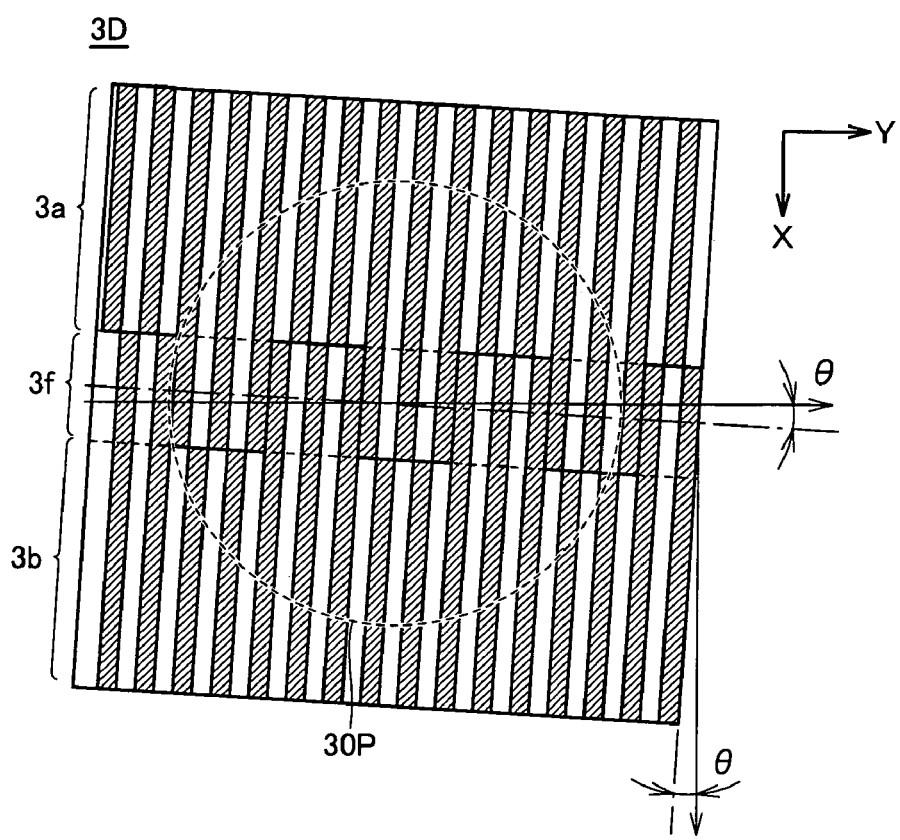

FIG. 10 shows a periodical structure of diffraction grating 3D in the third exemplary variation of the first embodiment of the present invention.

As shown in the figure, the third exemplary variation provides diffraction grating 3D divided into first, second and third regions 3a, 3b and 3f by a line having a direction perpendicular to that of its grating grooves, with each region having a structure with a protrusion and a depression that extend in a direction inclined relative to direction X by angle θ and are periodically repeated.

The third exemplary variation provides diffraction grating 3D having the third region 3f located intermediate between the first and second regions 3a and 3b and alternately having the first region 3a structure formed of a protrusion and a depression periodically repeated and the second region 3b structure formed of a protrusion and a depression periodically repeated. If a direction corresponding to that of guide groove 61 of optical disk 6 is represented as direction Y and a direction perpendicular thereto is represented as direction X, then the third exemplary variation provides diffraction grating 3D having grating grooves set in a direction inclined relative to directions X and Y by angle θ, similarly as has been described for diffraction grating 3A with reference to FIG. 3.

The third exemplary variation provides diffraction grating 3D having the first and second regions 3a and 3b with a boundary therebetween in the form of a comb, and that boundary can be regarded as the third region 3f. This example is also as effective as or more effective than the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device having a laser as a source of light emitting light in turn branched via an optical branching element into at least three beams of light including a main beam and two sub beams in turn condensed via an objective lens on an optical recording medium at a guide groove and reflected by said optical recording medium to provide three reflections of light in turn received by different detectors, each divided into two regions, respectively, to obtain a differential signal from said detectors to generate a tracking error signal from said differential signal, wherein:

said optical branching element is a diffraction grating divided into at least three regions including a first region, a second region and a third region located intermediate between said first and second regions, said first, second and third regions have a periodical structure with their respective phases different from each other, said periodical structure has grating grooves in a direction determined depending on said phase of said second region and so as to be inclined relative to a direction that is perpendicular to said guide groove of said optical recording medium; and if relative to said first region said second regions has a phase difference α in degrees, on said optical recording medium said main beam and said sub beams have a distance L therebetween, and said optical recording medium has said guide groove with a pitch M, then said optical branching element has said periodical structure with said grating grooves in a direction that is inclined relative to said direction perpendicular to said guide groove of said optical recording medium by an angle $\theta=((180-\alpha)/360)\tan^{-1}(M/L)$.

2. The optical pickup device according to claim 1, wherein said second region has said phase difference α of at least 30° and at most 180°.

3. The optical pickup device according to claim 1, wherein said third region is provided with a phase difference of approximately ½ of said phase difference α of said second region.

4. The optical pickup device according to claim 1, wherein said third region is further divided into at least two regions each having a different phase difference smaller than said phase difference α of said second region.

5. An optical pickup device comprising:

a laser as a source of light;

an optical branching element, where the emitting light from the laser is in turn branched via the optical branching element into at least three beams of light including a main beam and two sub beams that are in turn condensed via an objective lens on an optical recording medium at a guide groove and reflected by said optical recording medium to provide three reflections of light that are in turn received by different detectors, each divided into two regions, respectively, to obtain a differential signal from said detectors to generate a tracking error signal from said differential signal;

wherein said optical branching element forms a diffraction grating that is divided into at least three regions including a first region, a second region and a third region that is located intermediate between said first and second regions, wherein said first, second and third regions have a periodical structure with their respective phases different from each other, said periodical structure having grating grooves in a direction determined depending on said phase of said second region and so as to be inclined relative to a direction that is perpendicular to said guide groove of said optical recording medium;

wherein if relative to said first region, said second region has a phase difference α in degrees, said main beam and said sub beams on said optical recording medium have a distance L therebetween, and said optical recording medium has said guide groove with a pitch M, then said optical branching element has said periodical structure with said grating grooves in a direction inclined relative to said direction perpendicular to said guide groove of said optical recording medium by an angle $\theta = ((180-\alpha)/360)\tan^{-1}(M/L)$; and wherein said third region is arranged so as to have a phase smoothly varying from that of said periodical structure of said first region to that of said periodical structure of said second region.

6. The optical pickup device according to claim 5, wherein one end of said third region is arranged so as to correspond to an end of said first region and another end of said third region is arranged so as to correspond to an end of said second region.

* * * * *